United States Patent
Sherman et al.

(10) Patent No.: US 10,086,979 B2
(45) Date of Patent: Oct. 2, 2018

(54) EDIBLE PASTE DISPENSER

(71) Applicants: MEYER INTELLECTUAL PROPERTIES LTD., Kowloon (HK); Edward S. Sherman, Vallejo, CA (US); Stephanie J. Lo Duca, Vallejo, CA (US); James T. Bond, Santa Rosa, CA (US)

(72) Inventors: Edward S. Sherman, Santa Rosa, CA (US); Stephanie J. Lo Duca, Fairfield, CA (US); James T. Bond, Santa Rosa, CA (US)

(73) Assignee: Meyer Intellectual Properties Limited (VG)

(*) Notice: Subject to any disclaimer, the term of this patent is extended or adjusted under 35 U.S.C. 154(b) by 5 days.

(21) Appl. No.: 15/321,510

(22) PCT Filed: Jul. 1, 2015

(86) PCT No.: PCT/US2015/038786
§ 371 (c)(1),
(2) Date: Dec. 22, 2016

(87) PCT Pub. No.: WO2016/004176
PCT Pub. Date: Jan. 7, 2016

(65) Prior Publication Data
US 2017/0203884 A1     Jul. 20, 2017

Related U.S. Application Data

(60) Provisional application No. 62/020,024, filed on Jul. 2, 2014.

(51) Int. Cl.
*B65D 35/38*     (2006.01)
*B65D 35/22*     (2006.01)
(Continued)

(52) U.S. Cl.
CPC ............ *B65D 35/38* (2013.01); *A21C 15/005* (2013.01); *A23G 3/28* (2013.01); *B65D 35/22* (2013.01); *B65D 81/3288* (2013.01)

(58) Field of Classification Search
CPC .... B65D 35/38; B65D 35/22; B65D 81/3288; B65D 81/3255; B65D 81/3261; A21C 15/005; A21C 15/002; A23G 3/28
(Continued)

(56) References Cited

U.S. PATENT DOCUMENTS 3,323,682 A * 6/1967 Creighton, Jr. ... B05C 17/00513
                                                        222/105
4,961,517 A * 10/1990 Tkac .................... A21C 15/005
                                                        222/568
(Continued)

OTHER PUBLICATIONS

International Search Report issued in connection with PCT/US15/38786.
Written Opinion issued in connection with PCT/US15/38786.

*Primary Examiner* — Paul R Durand
*Assistant Examiner* — Andrew P Bainbridge
(74) *Attorney, Agent, or Firm* — Akerman LLP (57) ABSTRACT

An edible paste dispenser for applying decorative icing to cakes and other foods includes a tip assembly that connects paste containing chambers of a dual-chamber pastry bag and directs edible paste into a common extrusion nozzle. The tip assembly includes a pair of mating tubes secured via a locking nut to the extrusion nozzle. The tubes each have a sidewall portion that is generally S-shaped in cross-section and permits stable assembly and cooperative engagement of one tube with the other tube. After insertion of a tube into each pastry bag chamber, the tubes are attached to a common extrusion nozzle. The resulting extruded paste can include two different colored decorations, which can appear swirled S or other curvilinear shape provided by the two engaged (Continued)

cones. The tips of the cones, and paste containing bags, terminate just above the exit portal of the common nozzle.

22 Claims, 9 Drawing Sheets

(51) Int. Cl.
*A23G 3/28* (2006.01)
*A21C 15/00* (2006.01)
*B65D 81/32* (2006.01)

(58) Field of Classification Search
USPC ... 222/92–107, 145.1, 145.3, 129, 132, 547, 222/566–575, 490–497
See application file for complete search history.

(56) References Cited

U.S. PATENT DOCUMENTS

| | | | | |
|---|---|---|---|---|
| 5,102,016 A * | 4/1992 | Ball | B05C 17/00513 | 222/145.3 |
| 5,114,044 A * | 5/1992 | Spanek, Jr. | A21C 15/005 | 222/568 |
| 5,249,709 A * | 10/1993 | Duckworth | B05C 17/00506 | 222/137 |
| 5,823,391 A * | 10/1998 | Klauke | B65D 35/22 | 215/10 |
| D413,063 S * | 8/1999 | Bell | D9/434 | |
| 5,954,234 A * | 9/1999 | Connan | B65D 81/325 | 222/94 |
| 6,257,450 B1 | 7/2001 | Jackson et al. | | |
| 6,325,229 B1 * | 12/2001 | Anders | B65D 21/0204 | 215/6 |
| 7,617,950 B2 * | 11/2009 | Norris | B65D 35/242 | 222/1 |
| 8,523,469 B2 * | 9/2013 | Abergel | B65D 81/3288 | 401/18 |
| 8,651,271 B1 * | 2/2014 | Shen | B65D 21/0204 | 206/216 |
| 8,870,027 B2 * | 10/2014 | Kraenzle | B65D 1/04 | 215/6 |
| 9,010,575 B2 * | 4/2015 | Read | A23G 3/28 | 222/107 |
| 2003/0106903 A1 * | 6/2003 | Chan | B65D 35/22 | 222/94 |
| 2004/0124210 A1 * | 7/2004 | Bartlein | B65D 75/5872 | 222/92 |
| 2006/0108363 A1 * | 5/2006 | Yates, III | B65D 1/04 | 220/23.4 |
| 2013/0306674 A1 * | 11/2013 | Read | A23G 3/28 | 222/94 |
| 2017/0203884 A1 * | 7/2017 | Sherman | B65D 35/38 | |
| 2017/0325466 A1 * | 11/2017 | Folkmar | A21C 15/005 | |

* cited by examiner

EDIBLE PASTE DISPENSER

CROSS-REFERENCE TO RELATED APPLICATION

This application is a national phase of PCT/US2015/038786, filed Jul. 1, 2015, and claims priority to U.S. Provisional Application No. 62/020,024, filed Jul. 2, 2014, the entire contents of both of which are hereby incorporated by reference.

BACKGROUND

An edible paste dispenser includes a cone-shaped, flexible pastry bag having a rigid tip assembly disposed in an opening in the pastry bag apex. The pastry bag can filled with an edible paste such as a frosting, meringue or vegetable mash, and by manually squeezing the bag, the paste is extruded through the tip assembly. When filled with frosting, the pastry bag is useful for applying the frosting to a cake in a decorative fashion. When filled with other edible pastes such as fillings or meringue, the pastry bag facilitates decorative plating or accurate, simple paste delivery. The tip assembly terminates in an extrusion nozzle having an outlet that is shaped to produce decorative effects in the extruded paste. The tip assembly is formed separately from the pastry bag to permit use of interchangeable extrusion nozzles, each extrusion nozzle having a different shaped and/or sized opening.

SUMMARY

In some aspects, a tip assembly for an edible paste dispenser includes a dual-passageway connector, a locking nut and a nozzle. The dual-passageway connector is formed from a first tube and a second tube, each of the first tube and the second tube having a base end, an apex end, a sidewall that defines a passageway that opens at the base end and the apex end, and a thread segment formed on an outer surface of the sidewall adjacent the apex end. The sidewall of the first tube has a first curvilinear portion; the sidewall of the second tube has a second curvilinear portion. The first curvilinear portion is shaped and dimensioned to be complementary with the second curvilinear portion, so that when the first tube is assembled with the second tube to form the connector, the first curvilinear portion forms a mating, nested engagement with the second curvilinear portion, and the thread segment of the first tube cooperates with thread segment of the second tube to form a continuous, helical, external thread about the connector. The locking nut includes an internal thread configured to engage the external thread; and the nozzle is secured to the connector via the locking nut. The nozzle is configured to receive the apex ends so as be in fluid communication with the inner chamber of each of the first tube and the second tube.

The tip assembly may include one or more of the following features: A cross-section of the first curvilinear portion forms a non-circular convex curve and a cross-section of the second curvilinear portion forms a non-circular concave curve that is complementary to the convex curve. A cross section of the first curvilinear portion and a cross-section of the second curvilinear portion are each generally S shaped. A cross section of the first tube and a cross-section of the second tube each have a tear-drop shape. The sidewall of the first tube includes a curved first outer sidewall, and a curved first inner sidewall that defines the first curvilinear portion and cooperates with the first outer sidewall to define a first paste delivery passageway. The sidewall of the second tube includes a curved second outer sidewall, and a curved second inner sidewall that defines the second curvilinear portion and cooperates with the second outer sidewall to define a second paste delivery passageway. When seen in an end view, the first inner sidewall and the second inner sidewall have complementary, generally S-shaped curves. The first outer sidewall and the second outer sidewall each have the shape of a convex circular curve, so that when the first tube is assembled with the second tube, a resulting assembly has a circular cross-sectional shape. The first outer sidewall and the first inner sidewall each have opposed axially-extending edges that co-terminate to form first tube side edges, the second outer sidewall and the second inner sidewall each have opposed axially-extending edges that co-terminate to form second tube side edges, and when the first tube is assembled with the second tube, respective first tube side edges align with corresponding second tube side edges to form side interfaces that lie at an angle relative to a longitudinal axis of the connector. Each of the first tube and the second tube has a maximum cross-sectional dimension at the base end, and a minimum cross-sectional dimension at the apex end, and when the first tube is assembled with the second tube to form the connector, the connector is cone shaped.

In some aspects, an edible paste dispenser includes the tip assembly. The edible pastry dispenser may include one or more of the following features: A flexible, dual-chamber pastry bag that is configured to receive the tip assembly thereon in a manner such that a. the first tube passageway communicates with a first chamber of the pastry bag, b. the second tube passageway communicates with a second chamber of the pastry bag, and c. the respective passageways are configured to deliver edible paste to the extrusion nozzle. A cross-section of the first curvilinear portion forms a non-circular convex curve and a cross-section of the second curvilinear portion forms a non-circular concave curve that is complementary to the convex curve. The sidewall of the first tube includes a curved first outer sidewall, and a curved first inner sidewall that defines the first curvilinear portion and cooperates with the first outer sidewall to define a first paste delivery passageway, the sidewall of the second tube includes a curved second outer sidewall, and a curved second inner sidewall that defines the second curvilinear portion and cooperates with the second outer sidewall to define a second paste delivery passageway, and when seen in an end view, the first inner sidewall and the second inner sidewall have complementary, generally S-shaped curves. The first outer sidewall and the second outer sidewall each have the shape of a convex circular curve, so that when the first tube is assembled with the second tube, a resulting assembly has a circular cross-sectional shape. Each of the first tube and the second tube has a maximum cross-sectional dimension at the base end, and a minimum cross-sectional dimension at the apex end, and when the first tube is assembled with the second tube to form the connector, the connector is cone shaped.

In some aspects, a kit for applying an edible paste to foods includes a. a flexible, dual-chamber pastry bag and b. a dual-passageway connector. The dual-passageway connector includes a first tube configured to be received in a first chamber of the pastry bag, and a second tube configured to be received in a second chamber of the pastry bag, each of the first tube and the second tube having a base end, an apex end, a sidewall that defines a passageway that opens at the base end and the apex end, and a thread segment formed on an outer surface of the sidewall adjacent the apex end. The sidewall of the first tube has a first curvilinear portion, and the sidewall of the second tube has a second curvilinear portion. The first curvilinear portion is shaped and dimensioned to be complementary with the second curvilinear portion, so that when the first tube is assembled with the second tube to form the connector, the first curvilinear portion forms a mating nested engagement with the second curvilinear portion, and the thread segment of the first tube cooperates with thread segment of the second tube to form a continuous, helical, external thread about the connector. The kit further includes a nozzle that is configured to receive the apex ends so as be in fluid communication with the inner chamber of each of the first tube and the second tube, and a locking nut including an internal thread configured to engage the external thread. The locking nut is configured to secure the nozzle to the connector.

The kit may include one or more of the following features: The pastry bag includes an interior wall that divides an interior space of the pastry bag into two separate chambers that each open at opposed ends of the pastry bag. The pastry bag comprises a first bag portion and a second bag portion that is separable from the first bag portion, wherein the first bag portion is connected to the first passageway of the connector, and the second bag portion is connected to a second passageway of the connector. A cross-section of the first curvilinear portion forms a non-circular convex curve and a cross-section of the second curvilinear portion forms a non-circular concave curve that is complementary to the convex curve. The sidewall of the first tube includes a curved first outer sidewall, and a curved first inner sidewall that defines the first curvilinear portion and cooperates with the first outer sidewall to define a first paste delivery passageway, the sidewall of the second tube includes a curved second outer sidewall, and a curved second inner sidewall that defines the second curvilinear portion and cooperates with the second outer sidewall to define a second paste delivery passageway, and when seen in an end view, the first inner sidewall and the second inner sidewall have complementary, generally S-shaped curves. The first outer sidewall and the second outer sidewall each have the shape of a convex circular curve, so that when the first tube is assembled with the second tube, a resulting assembly has a circular cross-sectional shape.

In some aspects, an edible paste dispenser for applying decorative icing to cakes and other foods connects a pastry bag having two flexible paste-receiving chambers to a tip assembly having a common extrusion nozzle. The tip assembly includes a connector formed of a pair of mating, generally cone-shaped tubes secured together via a threaded, engaging locking nut that retains a narrow outlet end of the mated tubes within an extrusion nozzle. Each of the cone shaped tubes is formed of sidewalls having a cross section that includes a generally S-shaped portion that permits cooperative engagement and stable assembly of the mated tubes after insertion into the pastry bag. The tip assembly also includes the extrusion nozzle and the locking nut that secures the extrusion nozzle to the mated, cone-shaped tubes. The edible paste dispenser is assembled by insertion of the tubes into corresponding chambers of the pastry bag so that the outlet end is seated in an opening in the pastry bag apex and the tubes are mated so that the respective S-shaped portions are engaged and the connector is made whole. To complete the assembly, the extrusion nozzle is placed over the outlet end of the connector and secured thereto with the locking nut. In this configuration, the pastry bag's paste containing chambers are attached to a common extrusion nozzle. The resulting extruded paste can include two different colored decorations, which can appear as a swirled S or other curvilinear shape provided by the two engaged tubes of the connector. The tips of the tubes terminate just above the exit orifice of the common nozzle.

The edible paste dispenser is easy to assemble, and is free of snaps or tonsils that can wear out from use and fatigue. Because each cone-shaped tube has a cross section that includes the generally S-shaped portion that is complementary to and cooperatively engages with the generally S-shaped portion of the other cone shaped tube, the connector, and thus the nozzle assembly is secure when assembled. In addition, since the connector includes the complementary, engaged S-shaped portions, the extruded paste forms a decorative bead having a swirled appearance. The edible paste dispenser can be easily disassembled for convenient clean up.

Modes for carrying out the present invention are explained below by reference to an embodiment of the present invention shown in the attached drawings. The above-mentioned object, other objects, characteristics and advantages of the present invention will become apparent from the detailed description of the embodiment of the invention presented below in conjunction with the attached drawings.

DETAILED DESCRIPTION

Figure 1:
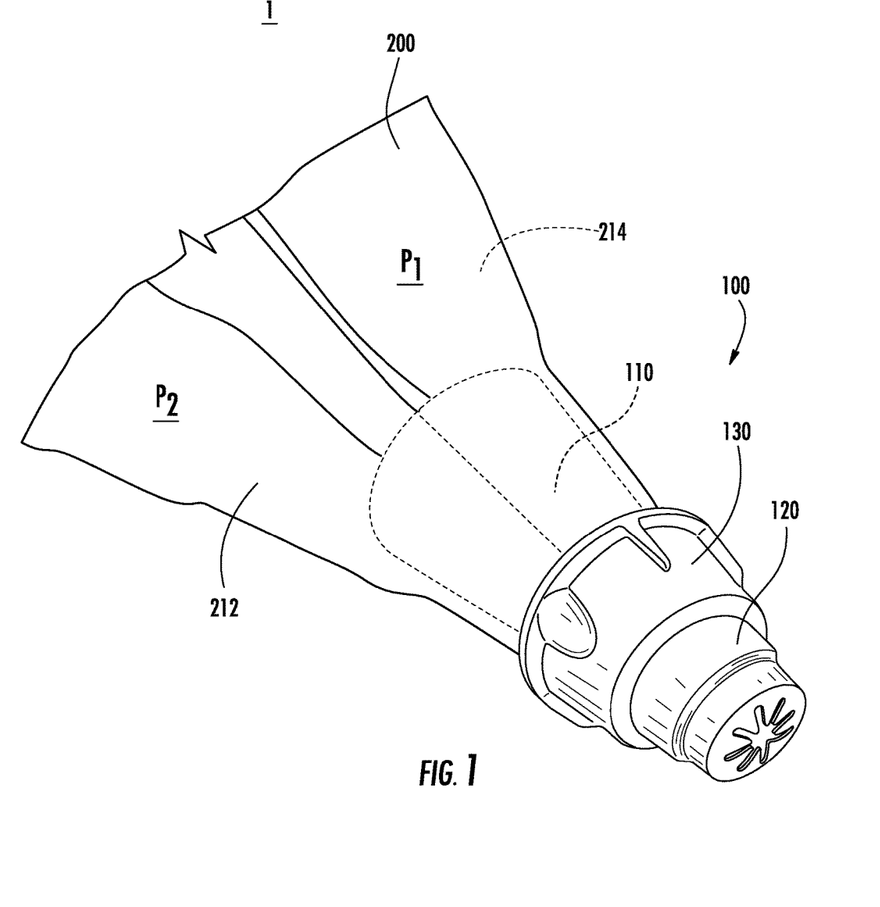
FIG. 1 is a front perspective view of an edible paste dispenser including a tip assembly mounted on a dual-chamber pastry bag.
Figure 2:
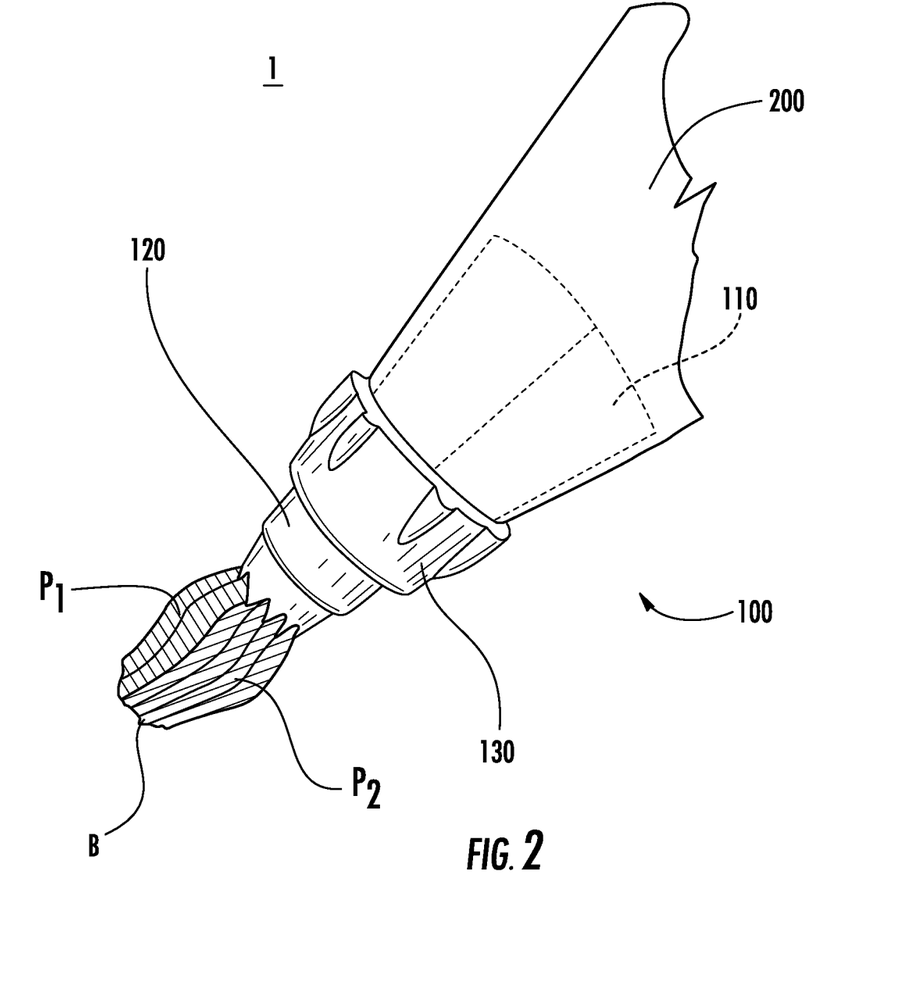
FIG. 2 is an illustration of a two-color decorative bead extruded from the edible paste dispenser of FIG. 1.

Referring to FIGS. 1 and 2, an edible paste dispenser 1 includes a cone-shaped, flexible pastry bag 200 having a rigid tip assembly 100 disposed in an opening in the pastry bag apex. The tip assembly 100 includes a dual-passageway connector 110, an extrusion nozzle 120, and a locking nut 130 that retains the extrusion nozzle 120 on an end of the connector 110. The pastry bag 200 is divided to provide two separate chambers 212, 214 so that two different edible pastes P1, P2 can be separately housed within the pastry bag 200. The rigid tip assembly 100 is configured so that one passageway 14a of the dual-passageway connector 110 receives edible paste P1 from one of the pastry bag chambers (e.g., chamber 212), and the other passageway 14b of the dual-passageway connector 110 receives edible paste P2 from the other pastry bag chamber (e.g., chamber 214). In addition, the passageways 14a, 14b of the connector 110 have an irregularly shaped cross-section, so that when the edible pastes P1, P2 are extruded from the edible paste dispenser 1, the extruded pastes form a single decorative bead B having a swirled appearance, as discussed further below.

Figure 3A:
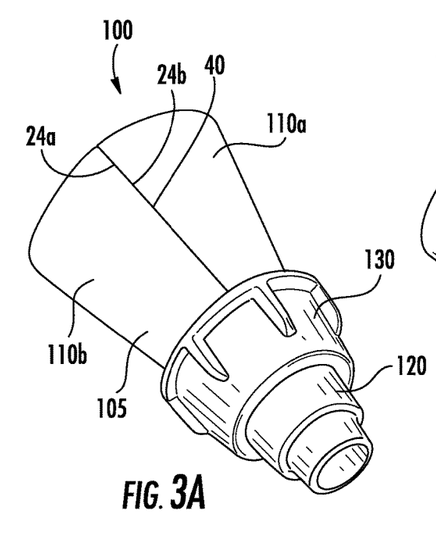
FIG. 3A is a perspective view of the tip assembly.
Figure 3B:
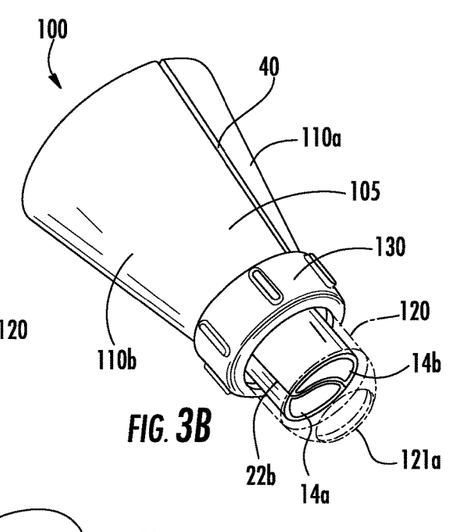
FIG. 3B is a perspective view of the tip assembly with the extrusion nozzle shown as transparent to illustrate the position of the connector support portion and within the extrusion nozzle.
Figure 3C:
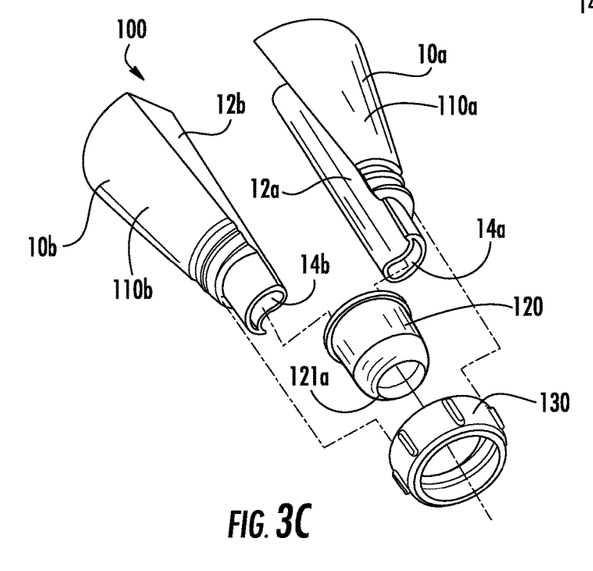
FIG. 3C is an exploded perspective view of the tip assembly.
Figure 4A:
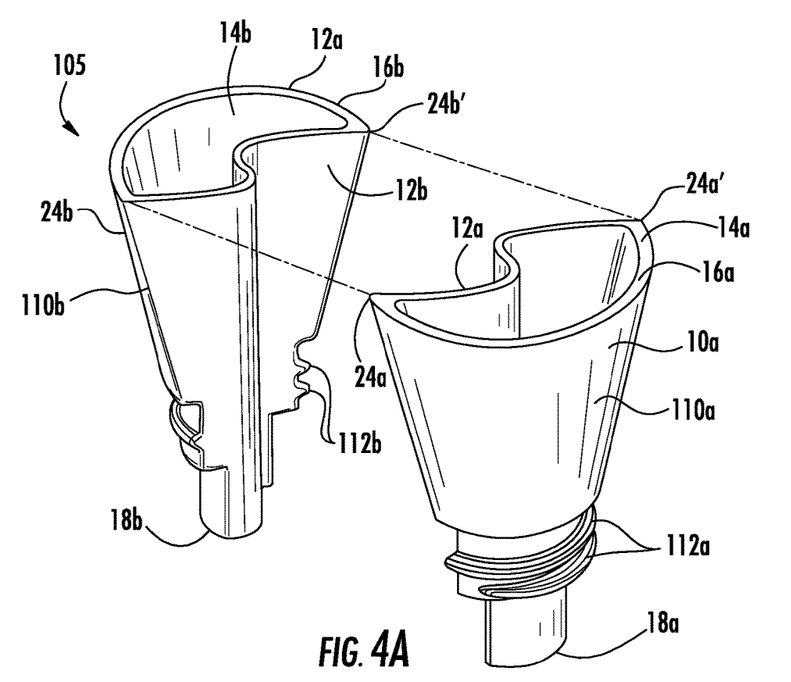
FIG. 4A is an exploded view of the dual-passageway connector of the tip assembly.
Figures 4B, 4C:
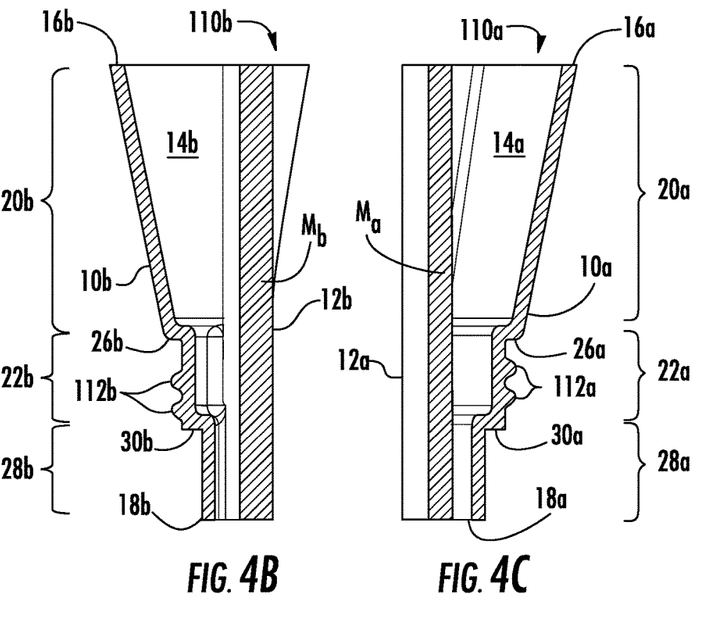
FIG. 4B is a cross-sectional view of the second tube of the dual-passageway connector.
FIG. 4C is a cross-sectional view of the first tube of the dual-passageway connector.

Referring to FIGS. 3A-3C, the dual-passageway connector 110 includes a first tube 110a and a second tube 110b having complementary shapes such that when assembled together, the first tube 110a and the second tube 110b form a conical tube 105 having two irregularly-shaped paste delivery passageways 14a, 14b.

Referring also to FIGS. 4A-4C and 5A-5C, the first tube 110a has a curved first outer sidewall 10a and a curved first inner sidewall 12a that are joined along common, axially-extending side edges 24a, 24a', and cooperate to define a first paste delivery passageway 14a. When seen in cross section (FIGS. 5B and 5C), the first outer sidewall 10a has the shape of a convex circular curve, and the first inner sidewall 12a has a generally S-shaped curve. The first outer sidewall 10a, the first inner sidewall 12a, and the first inner passageway 14a extend between a first tube base end 16a and a first tube apex end 18a. The first inner passageway 14a opens at both the first tube base end 16a and the first tube apex end 18a. The first tube 110a is tapered such that the first tube base end 16a is greater in cross sectional dimension than the first tube apex end 18a.

Similarly, the second tube 110b has a curved second outer sidewall 10b and a curved second inner sidewall 12b that are joined along common, axially-extending side edges 24b, 24b', and cooperate to define a second paste delivery passageway 14b. When seen in cross-section, the second outer sidewall 10b has the shape of a convex circular curve, and the second inner sidewall 12b has a generally S-shaped curve. The second outer sidewall 10b, the second inner sidewall 12b, and the second inner passageway 14b extend between a second tube base end 16b and a second tube apex end 18b. The second inner passageway 14b opens at both the second tube base end 16b and the second tube apex end 18b. The second tube 110b is tapered such that the second tube base end 16b is greater in cross sectional dimension than the second tube apex end 18b.

Figure 5A:
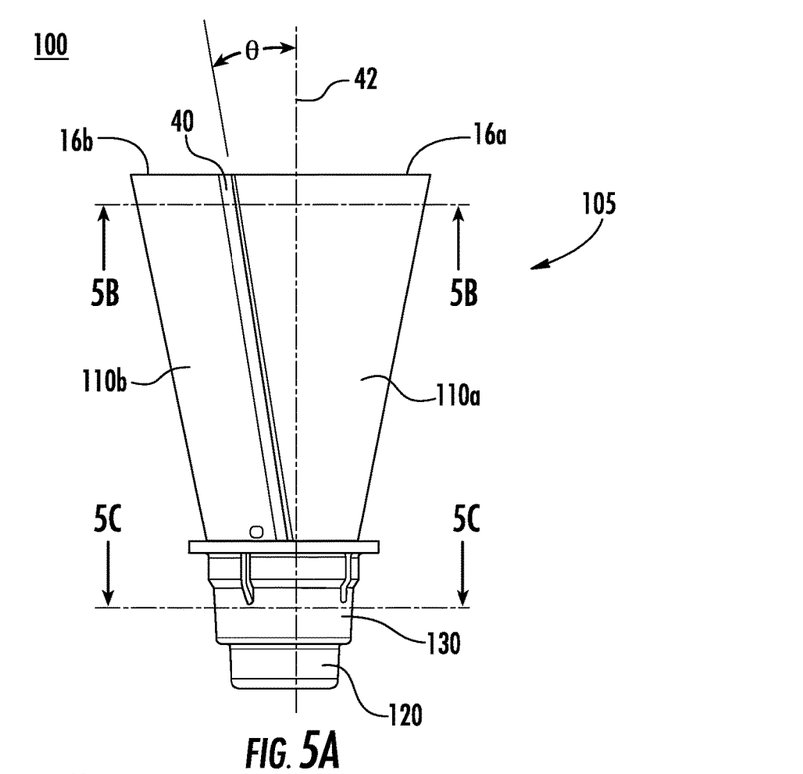
FIG. 5A is a side view of the tip assembly.
Figure 5B:
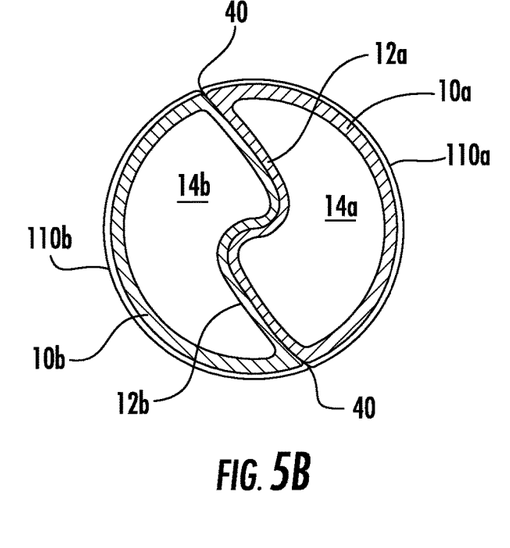
FIG. 5B is a cross-sectional view of the tip assembly as seen along line 5B-5B of FIG. 5A.
Figure 5C:
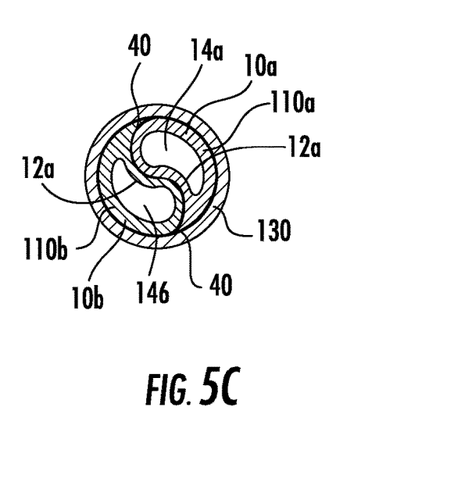
FIG. 5C is a cross-sectional view of the tip assembly as seen along line 5C-5C of FIG. 5A.

The shape of the first inner sidewall 12a is complementary to the shape of the second inner sidewall 12b so that when the connector 110 is assembled with the first inner sidewall 12a abutting the second inner sidewall 12b, the first inner sidewall 12a matingly engages with the second inner sidewall 12b (best seen in FIGS. 5B and 5C). In addition, when the first tube 110a is assembled with the second tube 110b, respective first tube side edges 24a, 24a' align with corresponding second tube side edges 24b, 24b' to form side interfaces 40. The first and second tube outer sidewalls 10a, 10b are configured so that the side interfaces 40 do not extend axially, and instead lie at an angle θ relative to a longitudinal axis 42 of the connector 110 (best seen in FIG. 5A).

In addition, the first outer sidewall 10a and the second outer sidewall 10b are tapered so the connector 110 has a maximum dimension at the base end 16a, 16b. In particular, the first outer sidewall 10a and the second outer sidewall 10b each include a tapered portion 20a, 20b, a threaded portion 22a, 22b and a support portion 28a, 28b. The tapered portion 22a, 22b extends from the base end 16a, 16b to a first shoulder 26a, 26b that is disposed between the apex end 18a, 18b and a midpoint Ma, Mb between the base end 16a, 16b and the apex end 18a, 18b. The threaded portion 22a, 22b protrudes from the first shoulder 26a, 26b to a second shoulder 30a, 30b. The threaded portion 22a, 22b is cylindrical in cross-section and includes an external helical thread segment 112a, 112b. The support portion 28a, 28b is also cylindrical, but of smaller diameter than the threaded portion 22a, 22b, and extends between the second shoulder 30a, 30b and the apex end 18a, 18b. The tapered portion 20a, 20b and the support portion 28a, 28b are generally smooth, e.g., they are free of surface features.

When the connector 110 is assembled with the first inner sidewall 12a abutting the second inner sidewall 12b, the first outer sidewall 10a and the second outer sidewall 10b cooperate to define a circular cross-sectional shape. In addition, the thread segment 112a of the first tube 110a cooperates with thread segment 112b of the second tube 110b to form a continuous, helical, external thread 112 about the connector 110.

The degree of curvature of the S-shaped, mating inner sidewalls 12a, 12b is greater adjacent the connector apex end 18a, 18b (FIG. 5C) than it is adjacent to the base end 16a, 16b (FIG. 5B). The curvature of the mating inner sidewalls 12a, 12b is more acute adjacent the apex end 18a, 18b in order to facilitate drawing of the edible paste into a tight, defined pattern as it exits the rigid tip assembly 100. The curvature of the mating inner sidewalls 12a, 12b is more relaxed adjacent to the base end 16a, 16b to facilitate removal from a mold during manufacturing.

Figure 6A:
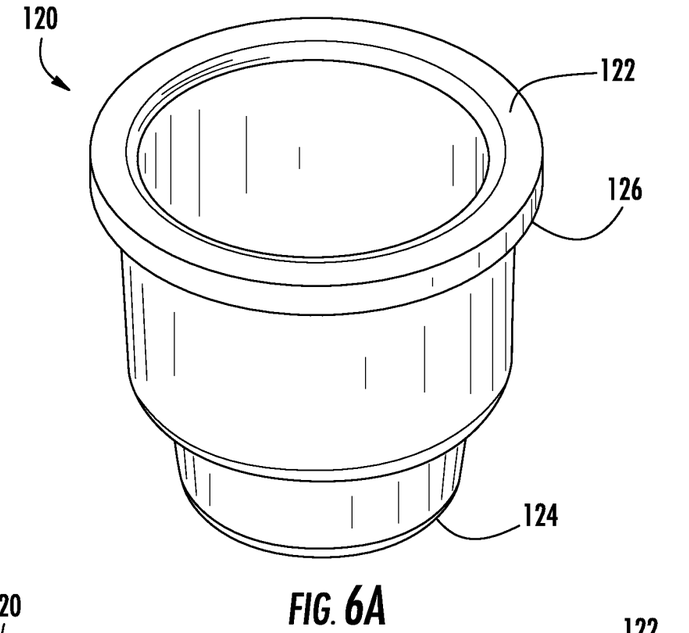
FIG. 6A is a perspective view of the extrusion nozzle of the tip assembly.
Figure 6B:
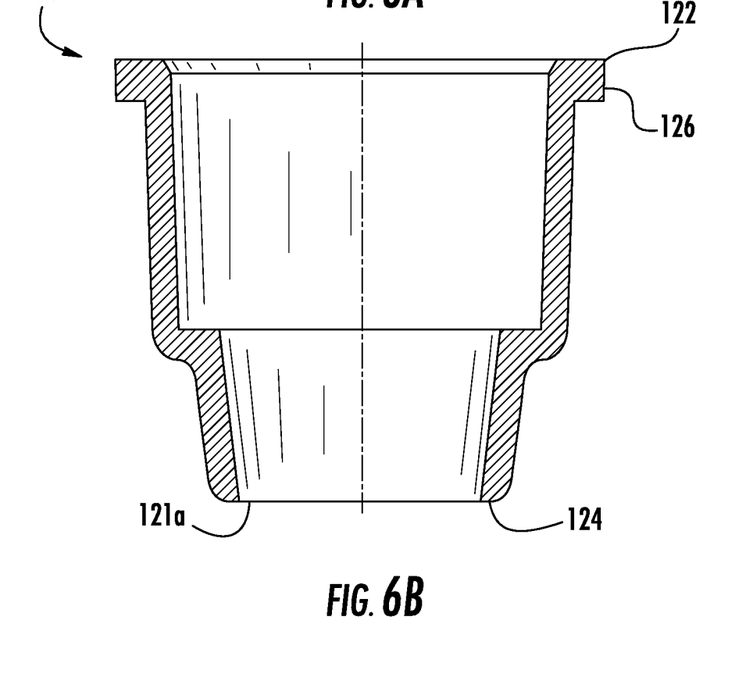
FIG. 6B is a cross-sectional view of the extrusion nozzle of FIG. 6A.

Referring to FIGS. 6A and 6B, the extrusion nozzle 120 is tubular, and includes an open base end 122 and an outlet end 124 opposed to the base end 122. The base end 122 includes a radially-outwardly protruding nozzle flange 126, and the outlet end 120 includes an orifice 121a. In addition, the extrusion nozzle 120 has an inner dimension that corresponds to the outer dimension of the connector support portion 28a, 28b, and the nozzle flange 126 has an outer dimension corresponding to the outer dimension of the second shoulder 30a, 30b. The orifice shape provides the extruded paste with decorative surface features, and thus the orifice 121a can have any shape, including, but not limited to, circular, polygonal and star-shaped.

Figure 7A:
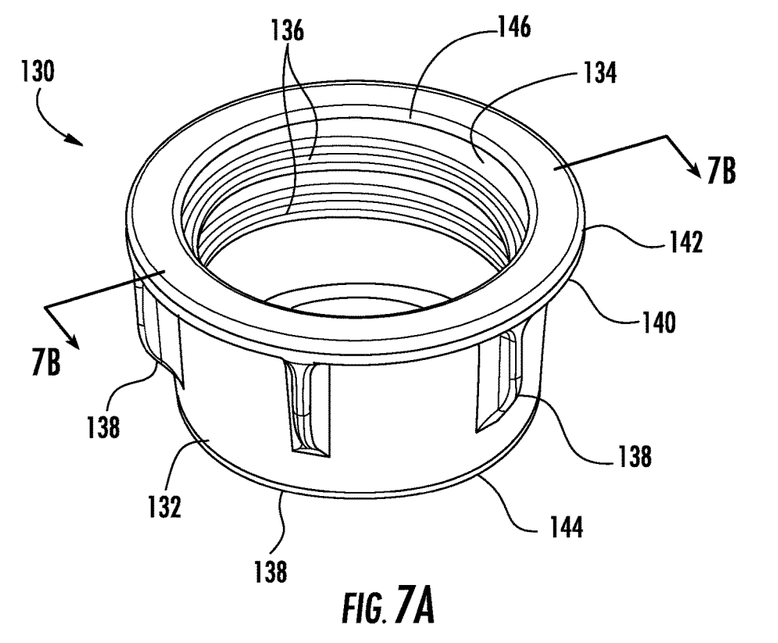
FIG. 7A is a perspective view of the locking nut of the tip assembly.
Figure 7B:
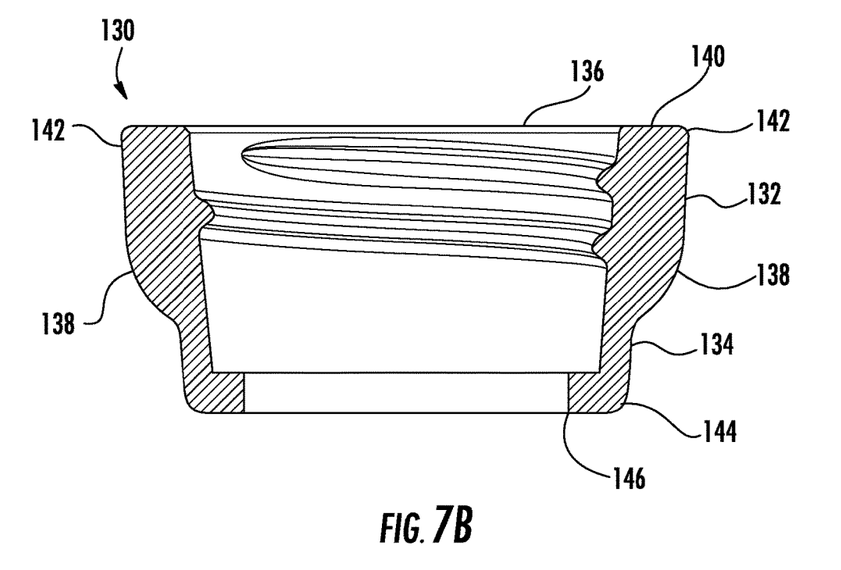
FIG. 7B is a cross-sectional view of the locking nut of FIG. 7A as seen along line 7B-7B of FIG. 7A.

Referring to FIGS. 7A and 7B, the locking nut 130 has an inner surface 134 having internal threads 136 that are shaped and dimensioned to receive and engage with the external threads 112 formed on the connector threaded portion 22a, 22b. The locking nut 130 includes an outer surface 132 which may have surface features, such as spaced apart projections and/or a grippable surface texture that enhance manual gripping of the locking nut 130. In the illustrated embodiment, the surface features are circumferentially spaced, axially-extending ridges 138, but are not limited to this. The locking nut 130 includes a first end 140 having a radially outwardly-protruding first nut flange 142, and an opposed second end 144 having a radially-inwardly protruding second nut flange 146.

Figure 8A:
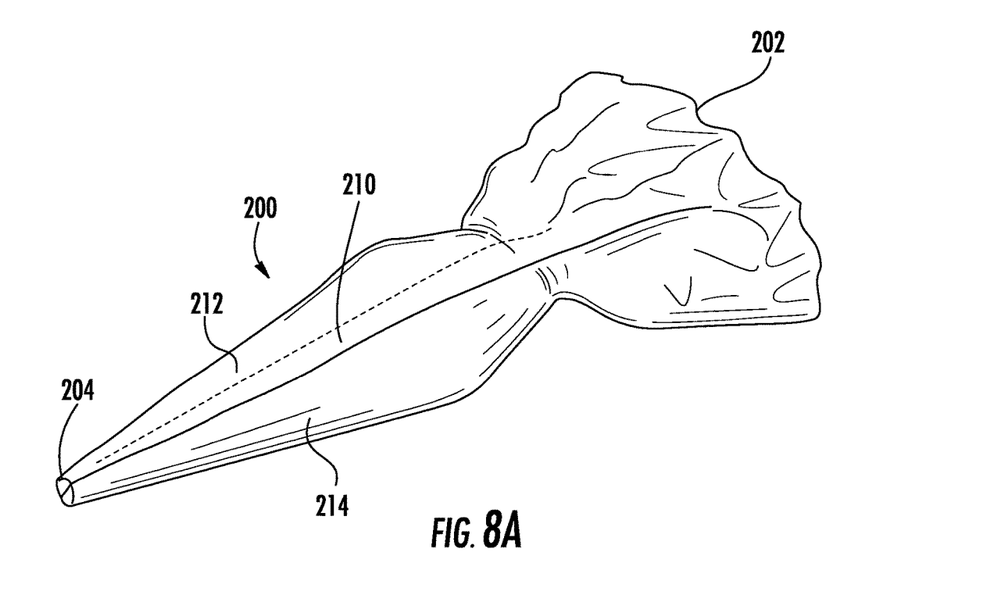
FIG. 8A is a side view of the dual-chamber pastry bag of FIG. 1.

Referring to FIG. 8A, the pastry bag 200 is a flexible conical envelope that includes an apex end 204, and an opposed, relatively wider, base end 202. An interior wall 210 that divides an interior space of the envelope into two separate chambers 212, 214 that extend from the apex end 204 to the base end 202. Each chamber 212, 214 opens at both the apex end 204 and the base end 202.

In use, the tubes 110a, 110b of the connector 110 are insert into corresponding chambers of the pastry bag 200 so that the respective apex ends 18a, 18b are seated in corresponding openings in the pastry bag apex end 204. While in the respective pastry bag chambers 212, 214, the tubes 110a, 110b are mated so that the respective S-shaped inner sidewalls 12a, 12b are engaged and the connector 110 is made whole, and the wall 210 is held between respective inner sidewalls 12a, 12b. Next, the extrusion nozzle 120 is mounted on the connector support portion 28a, 28b such that the base end 122 abuts the second shoulder 30a, 30b, and the support portion 28a, 28b protrudes into the extrusion nozzle 120. In some embodiments, the apex ends 18a, 18b of the tubes 110a, 110b extend to within 6 mm of the extrusion nozzle orifice 121a. In some embodiments, the support portion 28a, 28b of the connector 110 extends more than half the axial length of the extrusion nozzle 120, whereby the extrusion nozzle 120 is fully supported by the support portion 28a, 28b. With the extrusion nozzle 120 is mounted on the support portion 28a, 28b, the locking nut 130 is passed over the extrusion nozzle 120, and the locking nut internal thread 136 is engaged with the helical thread 112 formed on the connector threaded portion 22a, 22b. When the locking nut 130 is fully engaged, the outward nut flange 142 abuts the first shoulder 26a, 26b, and the inward nut flange 146 engages the extrusion nozzle flange 126, whereby the locking nut 130 retains the extrusion nozzle 120 on the connector 110. Since the connector 110 is formed having two parallel paste delivery passageways 14a, 14b, and since each passageway 14a, 14b communicates with a unique chamber of the pastry bag 200, when pressure is applied to the pastry bag 200, for example by squeezing the pastry bag 200, the edible paste flows through the paste delivery passageways 14a, 14b to the common nozzle 120, and is extruded from the orifice 121a. If the respective chambers 212, 214 of the pastry bag 200 are filled with different pastes, or filled with the same paste having different colors, the extruded paste can be a dollop or bead having two different colors or mixed flavors decorations (FIG. 2), which can appear as a swirled S or other curvilinear shape provided by the two engaged tubes of the connector.

Figure 9A:
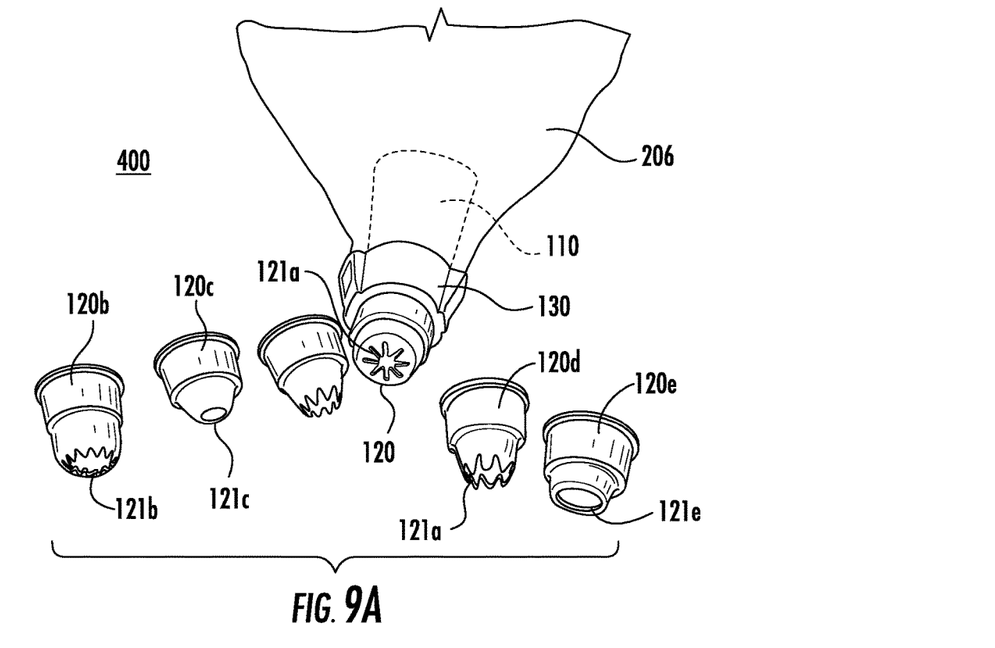
FIG. 9A illustrates an edible paste dispenser kit.

Referring to FIG. 9A, the elements of the edible paste dispenser 1 can be packaged together in the form of a paste dispensing kit 400 that includes at least one pastry bag 200, at least one dual-passageway connector 110, at least one locking nut 130, and several extrusion nozzles 120. In the paste dispensing kit 400, each extrusion nozzle 120 has a unique orifice 121 in terms of the shape and/or size of the orifice 121a. For example, the paste dispensing kit 400 may include a first extrusion nozzle 120 having a generally sun-shaped orifice 121a, a second extrusion nozzle 120b having a large-sized, fine, generally star-shaped orifice 121b, a third extrusion nozzle 120c having a small-sized circular orifice 121c, a fourth extrusion nozzle 120d having a medium-sized, coarse, generally star-shaped orifice 121d, a fifth extrusion nozzle 120e having a large-sized, coarse, generally star-shaped orifice 121e, and a sixth extrusion nozzle 120f having a large-sized, circular orifice 121f. Because the extrusion nozzle 120 and locking nut 130 are applied to the connector 110 from the outside of the pastry bag 200, the multiple extrusion nozzles 120, 120b, 120c, 120d, 120e, 120f are easily interchanged during use. It is contemplated that more or fewer extrusion nozzles 120 can be included in the paste dispensing kit 400, and the shape of extrusion nozzle orifices 121 are not limited to the examples shown in FIG. 9A.

Figure 9B:
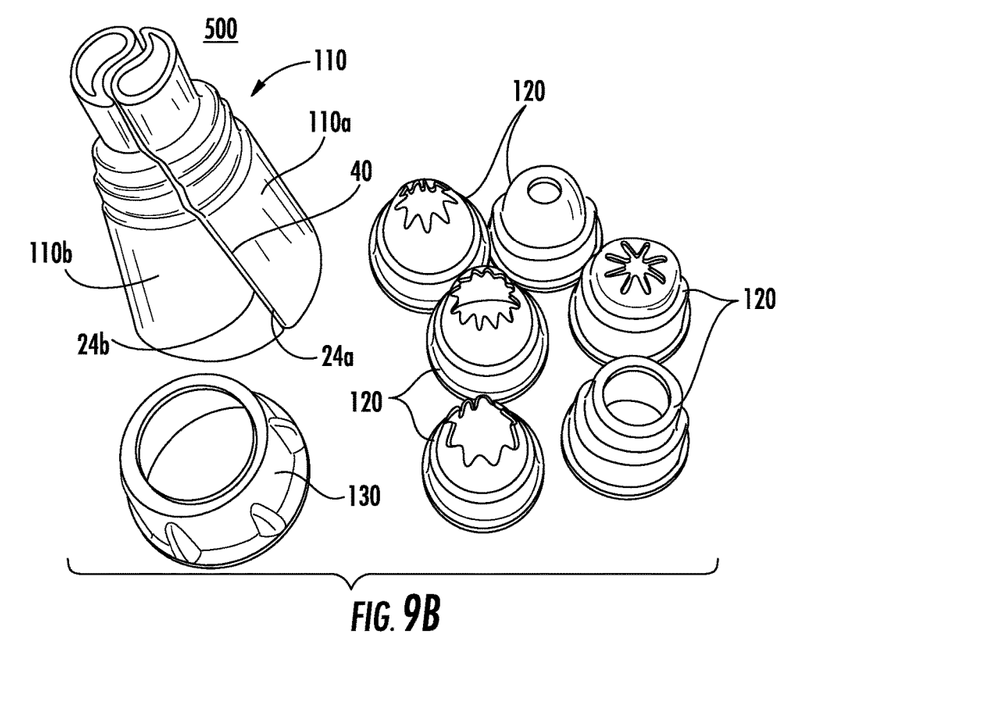
FIG. 9B illustrates a tip assembly kit.

Referring to FIG. 9B, the elements of the tip assembly 100 can be packaged together in the form of a tip assembly kit 500 that includes at least one dual-passageway connector 110, at least one locking nut 130, and several extrusion nozzles 120. In the tip assembly kit 500, each extrusion nozzle has a unique orifice 121a in terms of the shape and/or size of the orifice 121a. It is contemplated that more or fewer extrusion nozzles 120 can be included in the tip assembly kit 500, and the shape of the extrusion nozzle orifices 121 are not limited to the examples shown in FIG. 9B.

Figure 8B:
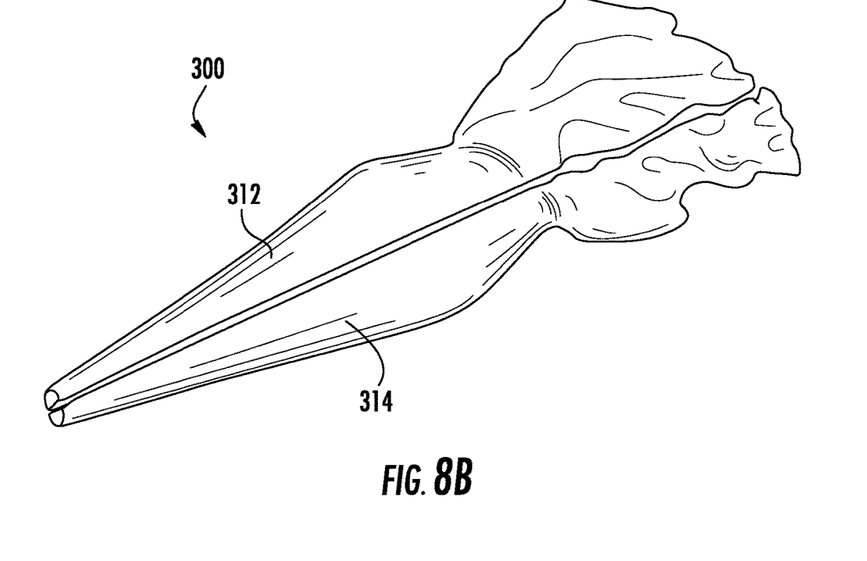
FIG. 8B is a side view of a pastry bag having two separable bags.

Referring to FIG. 8B, although the illustrated pastry bag 200 is a flexible conical envelope including a dividing interior wall 210, the pastry bag 200 is not limited to this configuration. For example, an alternative pastry bag 300 includes two separable bag portions 312, 314 that are retained in an adjoining configuration via the connector 110. Hence, each of the first tube 110a and the second tube 110b are inserted into the apex ends of the bag portions 312, 314. In use, the first bag portion 312 is connected to the first passageway 14a of the connector 110, and the second bag portion 314 is connected to the second passageway 14b of the connector 110.

Although the edible paste dispenser 1 is illustrated herein as having two paste-receiving chambers 212, 214, it is not limited to having two chambers. In some embodiments, the edible paste dispenser 1 can have 3, 4 or more chambers. For example, in a three-chamber edible paste dispenser, the pastry bag would include three chambers and the connector would include three tubes having complementary-shaped mating surfaces.

The extrusion nozzle 120 is described herein as having a single orifice 121a formed in the outlet end 124 thereof. However, the extrusion nozzle 120 is not limited to having a single orifice 121a, and may include multiple orifices. In some embodiments, there are multiple orifices that communicate with each paste delivery passageway 14a, 14b. In these embodiments, each paste delivery passageway may have the same number of orifices, or may alternatively have different numbers of orifices.

Selected illustrative embodiments of the edible pastry dispenser are described above in some detail. It should be understood that only structures considered necessary for clarifying the edible pastry dispenser have been described herein. Other conventional structures, and those of ancillary and auxiliary components of the edible pastry dispenser, are assumed to be known and understood by those skilled in the art. Moreover, while working examples of the edible pastry dispenser have been described above, the edible pastry dispenser is not limited to the working examples described above, but various design alterations may be carried out without departing from the edible pastry dispenser as set forth in the claims.

What is claimed is:

1. A tip assembly for an edible paste dispenser, the tip assembly comprising:
   a. a dual-passageway connector formed from a first tube and a second tube, each of the first tube and the second tube having
      i. a base end,
      ii. an apex end, iii. a sidewall that defines a passageway that opens at the base end and the apex end, and iv. a thread segment formed on an outer surface of the sidewall adjacent the apex end, the sidewall of the first tube having a first curvilinear portion, the sidewall of the second tube having a second curvilinear portion, the first curvilinear portion being shaped and dimensioned to be complementary with the second curvilinear portion, wherein when the first tube is assembled with the second tube to form the connector, the first curvilinear portion forms a mating, nested engagement with the second curvilinear portion, and the thread segment of the first tube cooperates with thread segment of the second tube to form a continuous, helical, external thread about the connector, wherein the first curvilinear portion extends from the base end to the apex end of the first tube, wherein the second curvilinear portion extends from the base end to the apex end of the second tube;

b. a locking nut including an internal thread configured to engage the external thread; and c. a nozzle secured to the connector via the locking nut, the nozzle configured to receive the apex ends such that the apex ends of the first and second tubes extend into a portion of the nozzle, wherein the nozzle is in fluid communication with the inner chamber of each of the first tube and the second tube.

2. The tip assembly of claim 1, wherein a cross-section of the first curvilinear portion forms a non-circular convex curve and a cross-section of the second curvilinear portion forms a non-circular concave curve that is complementary to the convex curve.

3. The tip assembly of claim 1, wherein a cross section of the first tube and a cross-section of the second tube each have a tear-drop shape.

4. The tip assembly of claim 1, wherein
the sidewall of the first tube includes a curved first outer sidewall, and a curved first inner sidewall that defines the first curvilinear portion and cooperates with the first outer sidewall to define a first paste delivery passageway,
the sidewall of the second tube includes a curved second outer sidewall, and a curved second inner sidewall that defines the second curvilinear portion and cooperates with the second outer sidewall to define a second paste delivery passageway, and
when seen in an end view, the first inner sidewall and the second inner sidewall have complementary, generally S-shaped curves.

5. The tip assembly of claim 4, wherein
the first outer sidewall and the second outer sidewall each have the shape of a convex circular curve, wherein when the first tube is assembled with the second tube, a resulting assembly has a circular cross-sectional shape.

6. The tip assembly of claim 4, wherein
the first outer sidewall and the first inner sidewall each have opposed axially-extending edges that co-terminate to form first tube side edges,
the second outer sidewall and the second inner sidewall each have opposed axially-extending edges that co-terminate to form second tube side edges, and
when the first tube is assembled with the second tube, respective first tube side edges align with corresponding second tube side edges to form side interfaces that lie at an angle relative to a longitudinal axis of the connector.

7. The tip assembly of claim 1, wherein each of the first tube and the second tube has a maximum cross-sectional dimension at the base end, and a minimum cross-sectional dimension at the apex end, and when the first tube is assembled with the second tube to form the connector, the connector is cone shaped.

8. The edible paste dispenser of claim 1, wherein each of the first tube and the second tube has a maximum cross-sectional dimension at the base end, and a minimum cross-sectional dimension at the apex end, and when the first tube is assembled with the second tube to form the connector, the connector is cone shaped.

9. The tip assembly of claim 1, wherein the apex ends of the first and second tubes extend into the nozzle more than half the axial length of the nozzle.

10. The tip assembly of claim 1, wherein the apex ends of the first and second tubes extend to within 6 mm of an extrusion orifice of the nozzle.

11. A tip assembly for an edible paste dispenser, the tip assembly comprising:
a. a dual-passageway connector formed from a first tube and a second tube, each of the first tube and the second tube having
i. a base end,
ii. an apex end,
iii. a sidewall that defines a passageway that opens at the base end and the apex end, and
iv. a thread segment formed on an outer surface of the sidewall adjacent the apex end, the sidewall of the first tube having a first curvilinear portion, the sidewall of the second tube having a second curvilinear portion, the first curvilinear portion being shaped and dimensioned to be complementary with the second curvilinear portion,
wherein a cross-section of the first curvilinear portion forms a non-circular convex curve and a cross-section of the second curvilinear portion forms a non-circular concave curve that is complementary to the convex curve, and
wherein when the first tube is assembled with the second tube to form the connector, the first curvilinear portion forms a mating, nested engagement with the second curvilinear portion, and the thread segment of the first tube cooperates with thread segment of the second tube to form a continuous, helical, external thread about the connector;
b. a locking nut including an internal thread configured to engage the external thread; and
c. a nozzle secured to the connector via the locking nut, the nozzle configured to receive the apex ends, wherein the nozzle is in fluid communication with the inner chamber of each of the first tube and the second tube,
wherein a cross section of the first curvilinear portion and a cross-section of the second curvilinear portion are each generally S shaped, wherein the first curvilinear portion extends from the base end to the apex end of the first tube, wherein the second curvilinear portion extends from the base end to the apex end of the second tube.

12. An edible paste dispenser comprising a tip assembly, the tip assembly including:
a. a dual-passageway connector formed from a first tube and a second tube, each of the first tube and the second tube having
i. a base end,
ii. an apex end, iii. a sidewall that defines a passageway that opens at the base end and the apex end, and iv. a thread segment formed on an outer surface of the sidewall adjacent the apex end, the sidewall of the first tube having a first curvilinear portion, the sidewall of the second tube having a second curvilinear portion, the first curvilinear portion being shaped and dimensioned to be complementary with the second curvilinear portion, wherein when the first tube is assembled with the second tube to form the connector, the first curvilinear portion forms a mating nested engagement with the second curvilinear portion, and the thread segment of the first tube cooperates with thread segment of the second tube to form a continuous, helical, external thread about the connector, wherein the first curvilinear portion extends from the base end to the apex end of the first tube, wherein the second curvilinear portion extends from the base end to the apex end of the second tube;

b. a locking nut including an internal thread configured to engage the external thread; and c. a nozzle secured to the connector via the locking nut, the nozzle configured to receive the apex ends such that the apex ends of the first and second tubes extend into a portion of the nozzle, wherein the nozzle is in fluid communication with the inner chamber of each of the first tube and the second tube.

13. The edible paste dispenser of claim 12, including a flexible, dual-chamber pastry bag that is configured to receive the tip assembly thereon in a manner such that
   a. the first tube passageway communicates with a first chamber of the pastry bag,
   b. the second tube passageway communicates with a second chamber of the pastry bag, and
   c. the respective passageways are configured to deliver edible paste to the extrusion nozzle.

14. The edible paste dispenser of claim 12, wherein a cross-section of the first curvilinear portion forms a non-circular convex curve and a cross-section of the second curvilinear portion forms a non-circular concave curve that is complementary to the convex curve.

15. The edible paste dispenser of claim 12, wherein
   the sidewall of the first tube includes a curved first outer sidewall, and a curved first inner sidewall that defines the first curvilinear portion and cooperates with the first outer sidewall to define a first paste delivery passageway,
   the sidewall of the second tube includes a curved second outer sidewall, and a curved second inner sidewall that defines the second curvilinear portion and cooperates with the second outer sidewall to define a second paste delivery passageway, and
   when seen in an end view, the first inner sidewall and the second inner sidewall have complementary, generally S-shaped curves.

16. The edible paste dispenser of claim 15, wherein
   the first outer sidewall and the second outer sidewall each have the shape of a convex circular curve, wherein when the first tube is assembled with the second tube, a resulting assembly has a circular cross-sectional shape.

17. A kit for applying an edible paste to foods, the kit comprising:
   a. a flexible, dual-chamber pastry bag;
   b. a dual-passageway connector including a first tube configured to be received in a first chamber of the pastry bag, and a second tube configured to be received in a second chamber of the pastry bag, each of the first tube and the second tube having
      i. a base end,
      ii. an apex end,
      iii. a sidewall that defines a passageway that opens at the base end and the apex end, and
      iv. a thread segment formed on an outer surface of the sidewall adjacent the apex end,
   the sidewall of the first tube having a first curvilinear portion, the sidewall of the second tube having a second curvilinear portion, the first curvilinear portion being shaped and dimensioned to be complementary with the second curvilinear portion, wherein when the first tube is assembled with the second tube to form the connector, the first curvilinear portion forms a mating nested engagement with the second curvilinear portion, and the thread segment of the first tube cooperates with thread segment of the second tube to form a continuous, helical, external thread about the connector, wherein the first curvilinear portion extends from the base end to the apex end of the first tube, wherein the second curvilinear portion extends from the base end to the apex end of the second tube;
   c. a nozzle configured to receive the apex ends such that the apex ends of the first and second tubes extend into a portion of the nozzle, wherein the nozzle is in fluid communication with the inner chamber of each of the first tube and the second tube, and
   d. a locking nut including an internal thread configured to engage the external thread, the locking nut configured to secure the nozzle to the connector.

18. The kit of claim 17, wherein the pastry bag includes an interior wall that divides an interior space of the pastry bag into two separate chambers that each open at opposed ends of the pastry bag.

19. The kit of claim 17, wherein the pastry bag comprises a first bag portion and a second bag portion that is separable from the first bag portion, wherein the first bag portion is connected to the first passageway of the connector, and the second bag portion is connected to a second passageway of the connector.

20. The kit of claim 17, wherein a cross-section of the first curvilinear portion forms a non-circular convex curve and a cross-section of the second curvilinear portion forms a non-circular concave curve that is complementary to the convex curve.

21. The kit of claim 17, wherein
   the sidewall of the first tube includes a curved first outer sidewall, and a curved first inner sidewall that defines the first curvilinear portion and cooperates with the first outer sidewall to define a first paste delivery passageway,
   the sidewall of the second tube includes a curved second outer sidewall, and a curved second inner sidewall that defines the second curvilinear portion and cooperates with the second outer sidewall to define a second paste delivery passageway, and
   when seen in an end view, the first inner sidewall and the second inner sidewall have complementary, generally S-shaped curves.

22. The kit of claim 21, wherein
   the first outer sidewall and the second outer sidewall each have the shape of a convex circular curve, wherein when the first tube is assembled with the second tube, a resulting assembly has a circular cross-sectional shape.

* * * * *